US009162630B2

(12) United States Patent
Pluta

(10) Patent No.: US 9,162,630 B2
(45) Date of Patent: Oct. 20, 2015

(54) ADJUSTABLE SUPPORT FOR ELECTRONIC DEVICE WITHIN A CUP-HOLDER

(71) Applicant: Michael Richard Pluta, Huntington Beach, CA (US)

(72) Inventor: Michael Richard Pluta, Huntington Beach, CA (US)

( * ) Notice: Subject to any disclaimer, the term of this patent is extended or adjusted under 35 U.S.C. 154(b) by 134 days.

(21) Appl. No.: 13/933,115

(22) Filed: Jul. 1, 2013

(65) Prior Publication Data

US 2015/0001266 A1    Jan. 1, 2015

(51) Int. Cl.
*B60R 7/00* (2006.01)
*B60R 11/02* (2006.01)
*B60N 3/10* (2006.01)
*B60R 11/00* (2006.01)

(52) U.S. Cl.
CPC ........... *B60R 11/02* (2013.01); *B60N 3/102* (2013.01); *B60R 2011/0007* (2013.01); *B60R 2011/0061* (2013.01); *B60R 2011/0071* (2013.01)

(58) Field of Classification Search
CPC ....................................................... B60R 11/02
USPC ........ 224/544, 148.4, 148.5, 148.7, 281, 400, 224/542, 926; 248/576, 160, 311, 314, 248/278.1
See application file for complete search history.

(56) References Cited

U.S. PATENT DOCUMENTS

| | | | |
|---|---|---|---|
| 3,601,295 A * | 8/1971 | Lowe | 224/42.38 |
| 4,596,370 A * | 6/1986 | Adkins | B62J 11/00 224/414 |
| 4,943,111 A * | 7/1990 | VanderLaan | 297/188.17 |
| 5,033,709 A * | 7/1991 | Yuen | B60R 11/0241 224/558 |
| 5,088,673 A * | 2/1992 | Chandler | B60N 3/103 215/386 |
| 5,149,032 A * | 9/1992 | Jones et al. | 248/154 |
| 5,179,590 A * | 1/1993 | Wang | B60R 11/0241 224/482 |
| 5,187,744 A * | 2/1993 | Richter | B60R 11/0241 224/553 |
| 5,392,350 A * | 2/1995 | Swanson | B60R 11/02 379/426 |
| 5,560,578 A * | 10/1996 | Schenken et al. | 248/313 |
| 5,655,742 A * | 8/1997 | Whitman | B60N 3/108 224/926 |
| 5,745,565 A * | 4/1998 | Wakefield | 379/446 |
| 5,799,914 A * | 9/1998 | Chivallier et al. | 248/176.1 |
| D407,951 S * | 4/1999 | Philipson et al. | D7/619.1 |
| 6,002,921 A * | 12/1999 | Pfahlert et al. | 455/575.9 |
| 6,062,518 A * | 5/2000 | Etue | B60R 11/0241 224/542 |
| 6,641,102 B2 * | 11/2003 | Veltri et al. | B60N 3/103 220/737 |
| 6,827,318 B1 * | 12/2004 | Hsu Li | B60R 11/00 224/558 |
| 7,336,258 B1 * | 2/2008 | Goetsch et al. | 345/163 |
| 7,422,184 B2 * | 9/2008 | Carnevali | B60N 3/103 220/737 |
| 7,611,114 B1 * | 11/2009 | Griffin | A45F 5/00 220/737 |
| 7,954,773 B2 * | 6/2011 | Carnevali | B60N 3/103 220/737 |
| 2004/0086112 A1 * | 5/2004 | Hilger | B60R 11/0241 379/455 |
| 2010/0295228 A1 * | 11/2010 | Woody | 269/254 R |

* cited by examiner

*Primary Examiner* — Justin Larson
*Assistant Examiner* — Lester L Vanterpool
(74) *Attorney, Agent, or Firm* — Plager Schack LLP

(57) ABSTRACT

A support system for adjustably supporting an object such as an electronic device is provide for use with existing cup-holders, such as those found on automotive vehicles. The system include preferably a rigid yet flexible cup insert, rigid yet flexible extension member, and a fixed and/or adjustable cradle to support the object, where the extension member may be manipulated to permit adjustment of the cradle (and thus the object supported on the cradle) relative to the user and the existing cup-holder.

6 Claims, 9 Drawing Sheets

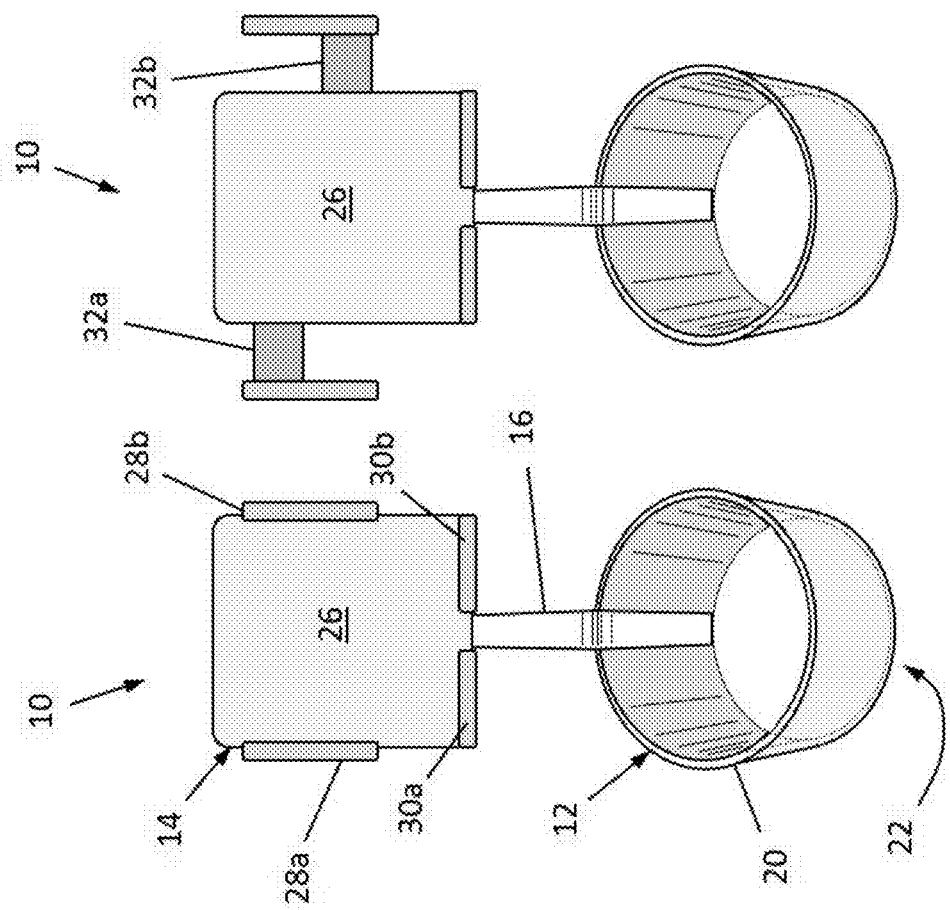

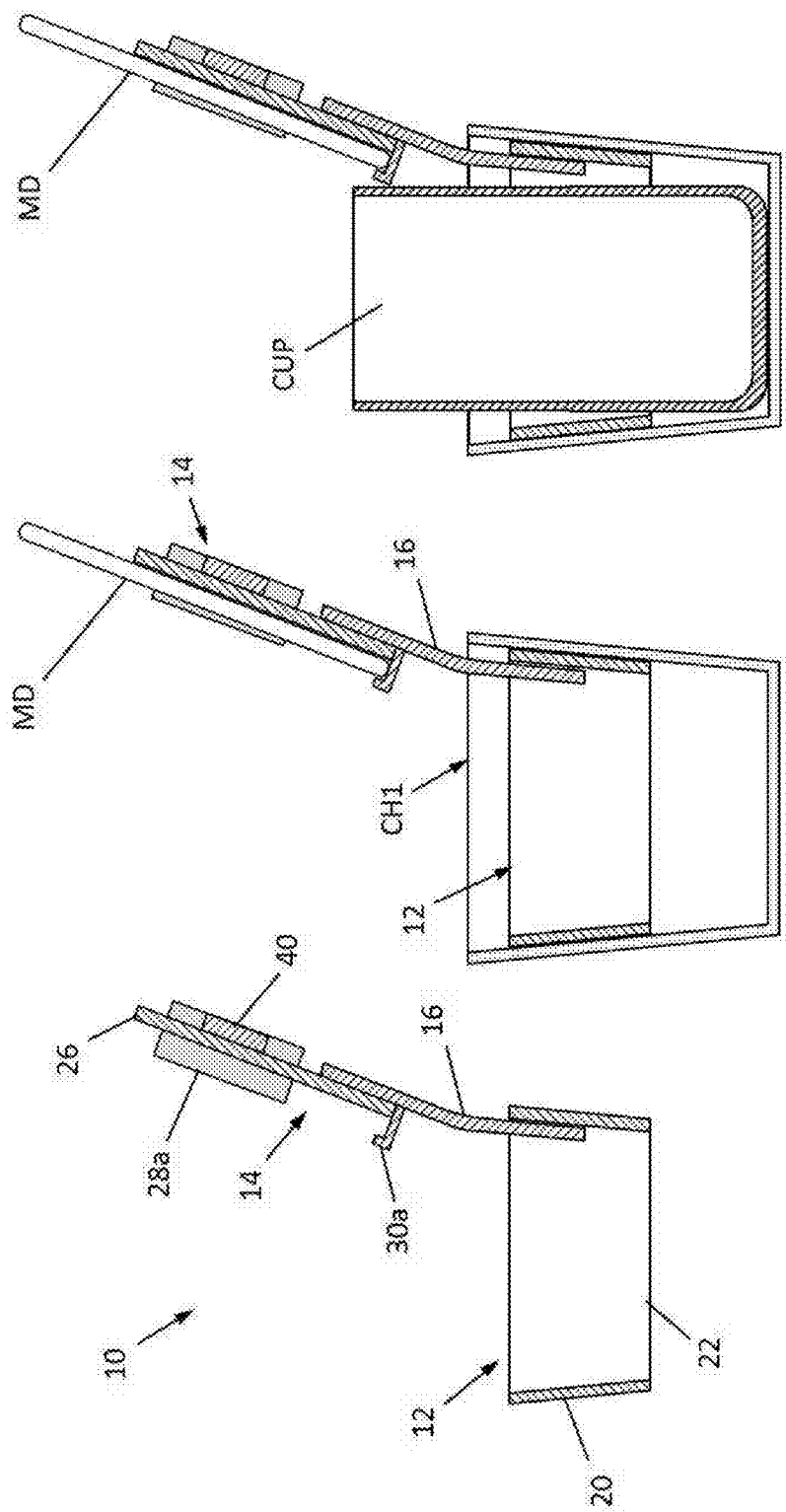

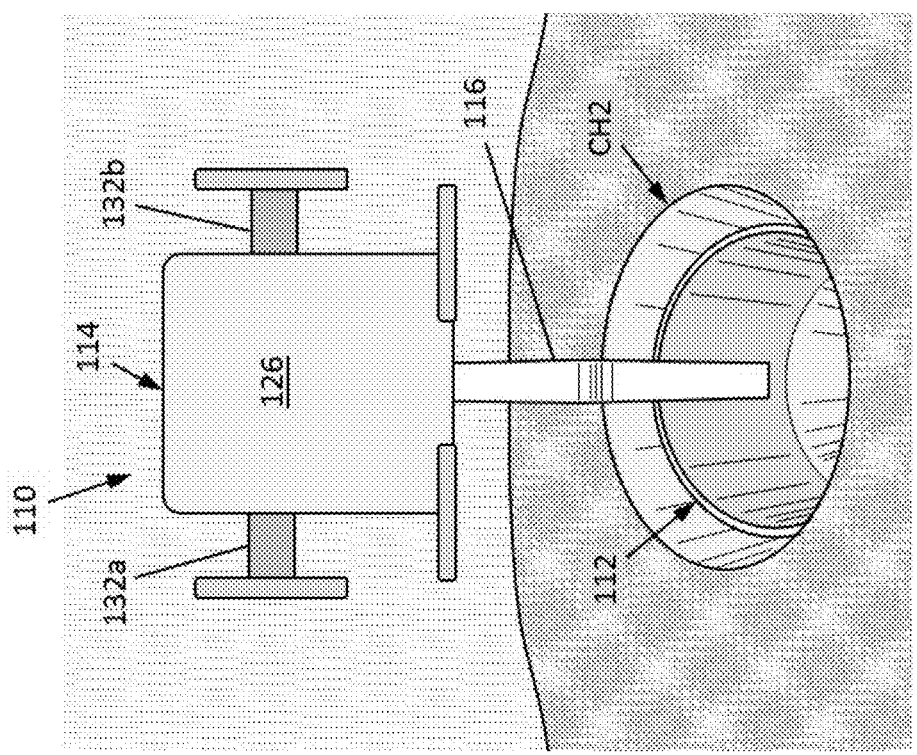

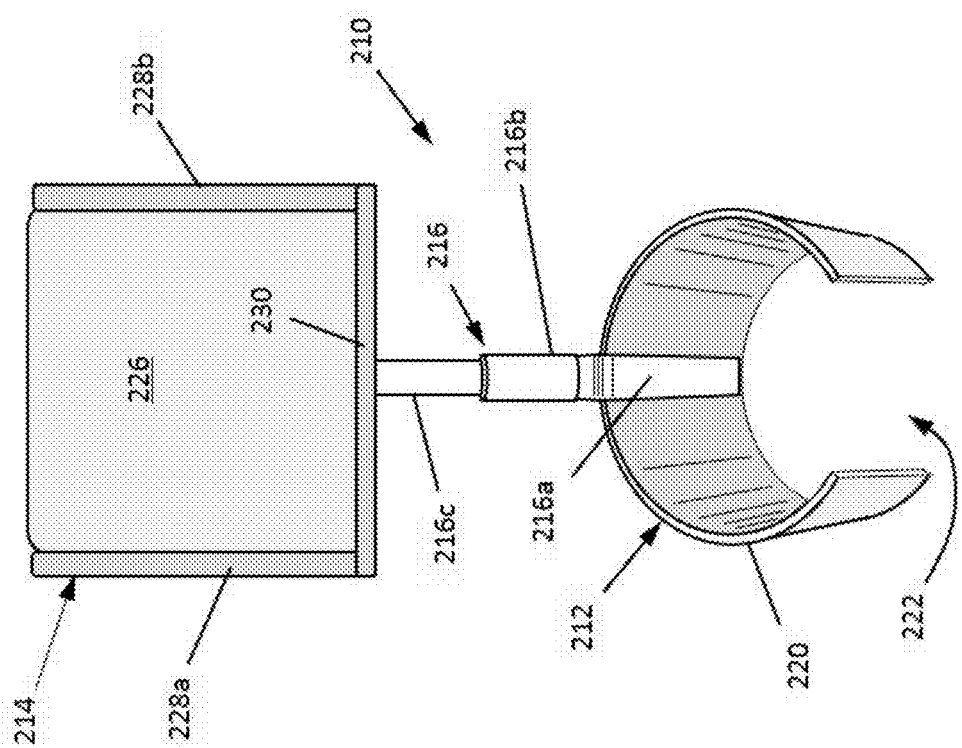

US 9,162,630 B2

ADJUSTABLE SUPPORT FOR ELECTRONIC DEVICE WITHIN A CUP-HOLDER

BACKGROUND

The embodiments herein relate generally to systems for adjustably supporting an electronic device within an existing cup-holder, such as those provided in automotive vehicles, thereby permitting flexible and efficient use of the electronic device in a manner that substantially increases "hands-free" usage. Beneficially, the embodiments herein permit use of the existing cup-holder to still hold contents contained in cups at the same time.

SUMMARY

A support system for adjustably supporting an electronic device, such as a smart phone, a tablet, etc., is provided for use with cup-holders, so that the display of the device is held substantially steady during use. The support system is configured for engagement with a cup-holder, such as those found on automotive vehicles, and comprises an insert made of a rigid yet flexible material, where in one embodiment the insert is shaped to snugly fit within the interior of the cup-holder. The system also includes a device cradle comprising, in one embodiment, a back plate against which the electronic device may rest, a ledge upon which the electronic device may rest, and adjustable first and second side panels configured to snugly engage the side of the electronic device when it is resting upon the ledge and against the back plate. In some embodiments, the adjustable first and second side panels are movable from a first open position, wider than the width of the electronic device, to a second closed position, substantially equal to the width of the electronic device so that the device cradle may snugly cradle the electronic device in a substantially steady position even when the user is driving an automotive vehicle within which the cup-holder resides. In some embodiments, the system further comprises an extension member affixed to the insert at a first end of the extension member and affixed to the device cradle at a second end of the extension member, the extension member comprising a substantially rigid material to aid in keeping the device cradle substantially steady while the support system is in use. If desired, the support system may include an adjustment mechanism secured to the device cradle to permit adjustable positioning of the first and second side panels between the open and closed positions.

BRIEF DESCRIPTION OF THE FIGURES

The detailed description of some embodiments of the invention will be made below with reference to the accompanying figures, wherein like numerals represent corresponding parts of the figures.

FIGS. 2A and 2B show schematic perspective views of one embodiment of the present invention;

FIGS. 4A through 4C show schematic sides views of the embodiment of FIGS. 3A through 3C;

FIG. 5 shows a schematic perspective views of another embodiment of the present invention in use with a second style of cup-holder;

FIG. 7 shows a perspective view of an alternative embodiment of the present invention;

DETAILED DESCRIPTION OF CERTAIN EMBODIMENTS

Figure 1B:
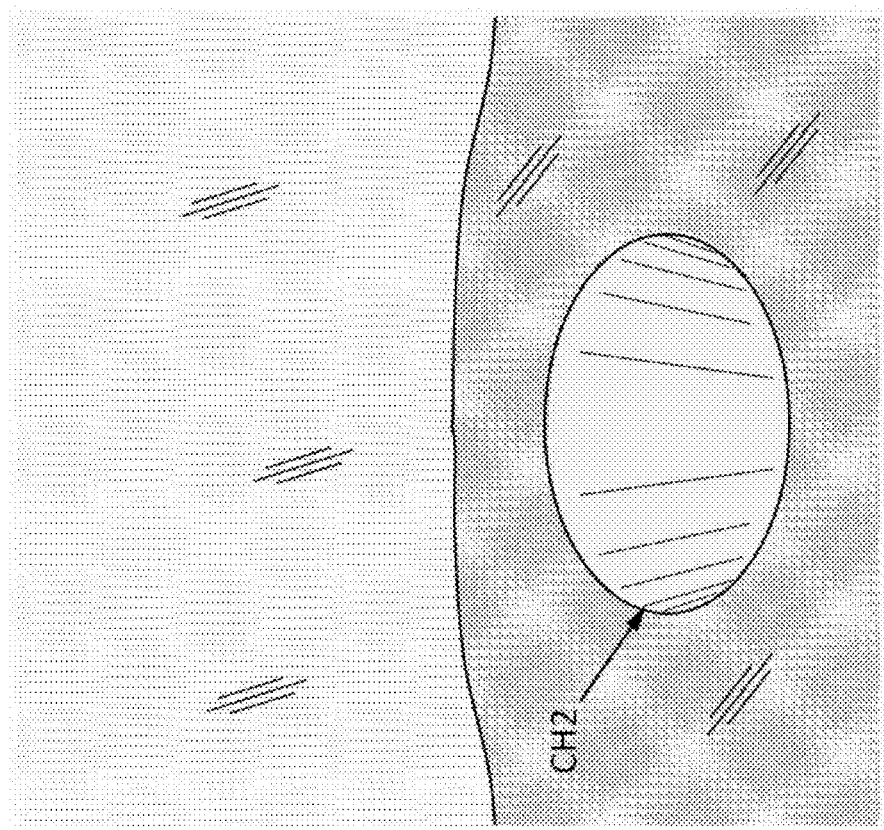
FIGS. 1A and 1B show schematic perspective views of two types of cup-holders, the first which is somewhat free-standing, and the other that is embedded within the console of the vehicle or support area.
Figure 1A:
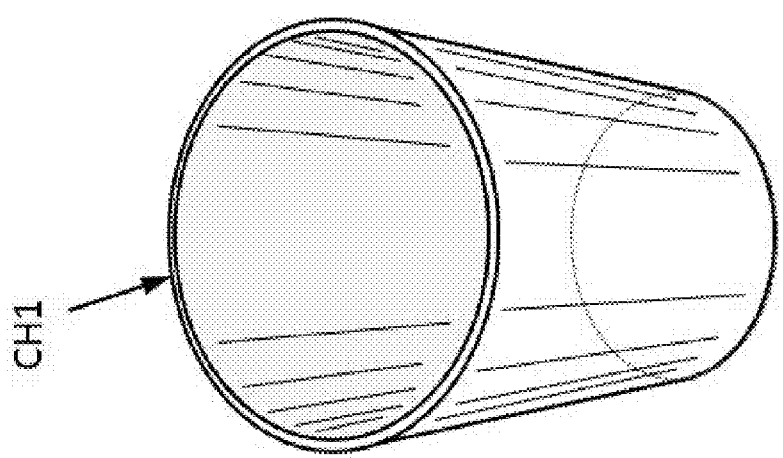

There are various types of cup-holders that exist, and embodiments of the present invention are configured to function with substantially all such cup-holders, whether they be stand-alone supported from the exterior or built-in to a floor or console panel. By way of example, and referring to FIGS. 1A and 1B, at least types of cup-holders CH1, CH2, are shown for context in appreciating the use of embodiments of the present system.

Figure 3C:
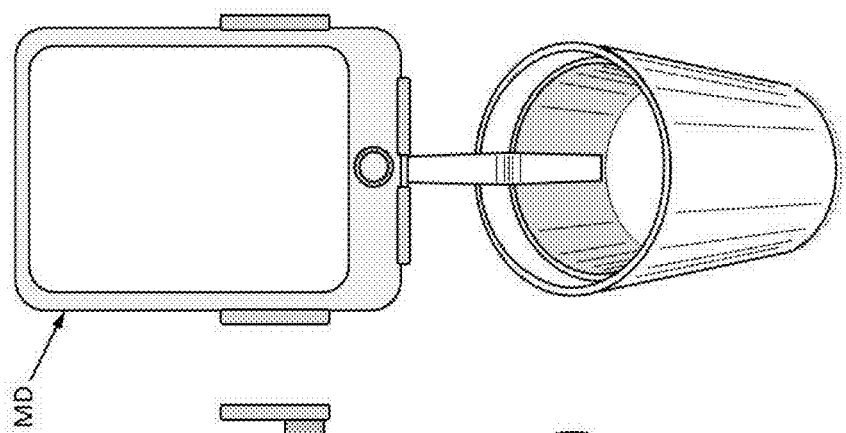
FIGS. 3A through 3C show schematic perspective views of the embodiment of FIGS. 2A and 2B in use with one style of cup-holder to hold one style of electronic (mobile) device.
Figure 3B:
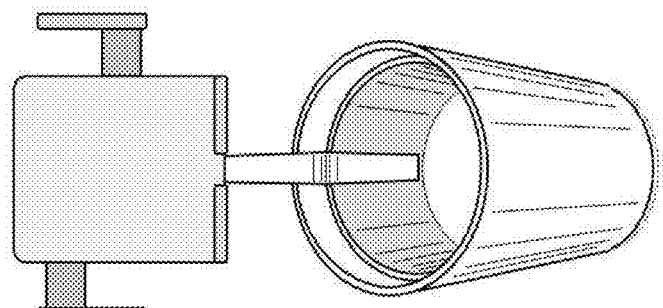
Figure 3A:
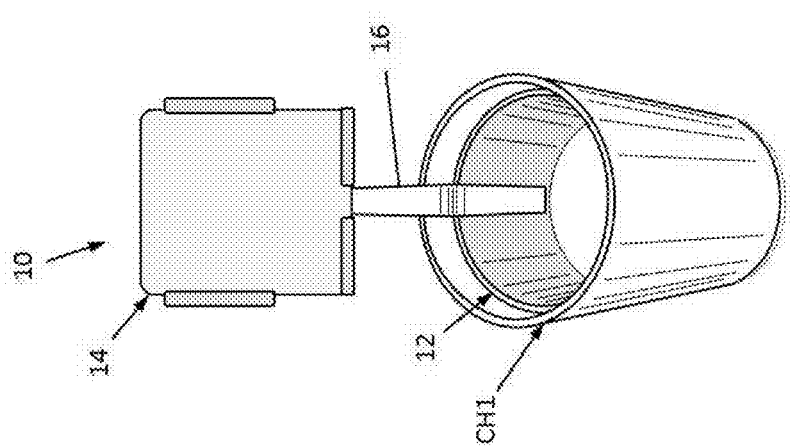

Referring to FIGS. 2A and 2B, as well as FIGS. 3A through 3C, one embodiment of the present invention comprises a cup insert 12 comprising a rigid yet flexible material, the insert having a shape configured to snugly fit within the interior of a cup-holder. The embodiment also comprises a device cradle 14 to support a mobile electronic device, or candidly any object that might appropriate lie flat and remain in place for view by a user. Embodiments of the present invention, such as the example shown, also comprises an extension member 16 to support the device cradle 14 from the cup insert 12. Examples of mobile electronic devices include smart phones, PDAs, tablets, navigation systems, etc. Objects may include papers, pamphlets, books, directories, media for presenting direction, photos, etc.

In one embodiment, the cup insert 12 may comprise a hollow geometric wall 20 having an opening 22 in the bottom to permit a complimentary fit within a cup-holder, such as example cup-holder CH1. In the case of the embodiment of FIGS. 2A and 2B, the insert 12 comprises a generally cylindrical wall 20, which in this case is tapered for use within a tapered or non-tapered cup-holder. The insert need not be tapered, and indeed may comprises a number of other configurations, as explained below. Moreover, its vertical dimension and thickness may vary depending upon the material used and general flexibility of the insert desired.

In the embodiment of FIGS. 2A and 2B, FIGS. 3A through 3C, and FIG. 4A thought 4C, the device cradle 14 preferably comprise a back plate 26 against which the electronic device or other object may rest, and a ledge upon which the electronic device may rest, which in this embodiment comprises first and second discrete ledges 30a, 30b. Preferably, the cradle further comprises adjustable first and second side panels 28a, 28b configured to be adjustable to snugly engage the side of the electronic device or object when it is resting upon the ledge 30a, 30b and against the back plate 26.

The adjustable first and second side panels 28a, 28b may be movable from a first open position, wider than the width of the electronic device or object to be supported, and a second closed position, substantially equal to the width of the electronic device or other object so that the device cradle may snugly cradle the electronic device in a substantially steady position even when the user is driving an automotive vehicle within which the cup-holder resides. In that regard, FIGS. 2A and 2B show the first and second positions, where it can be appreciated that the side panels 28*a*, 28*b* are supported by extension arms 32*a* and 32*b*, respectively, that may be moved laterally to adjust the first and second side panels.

Figure 6:
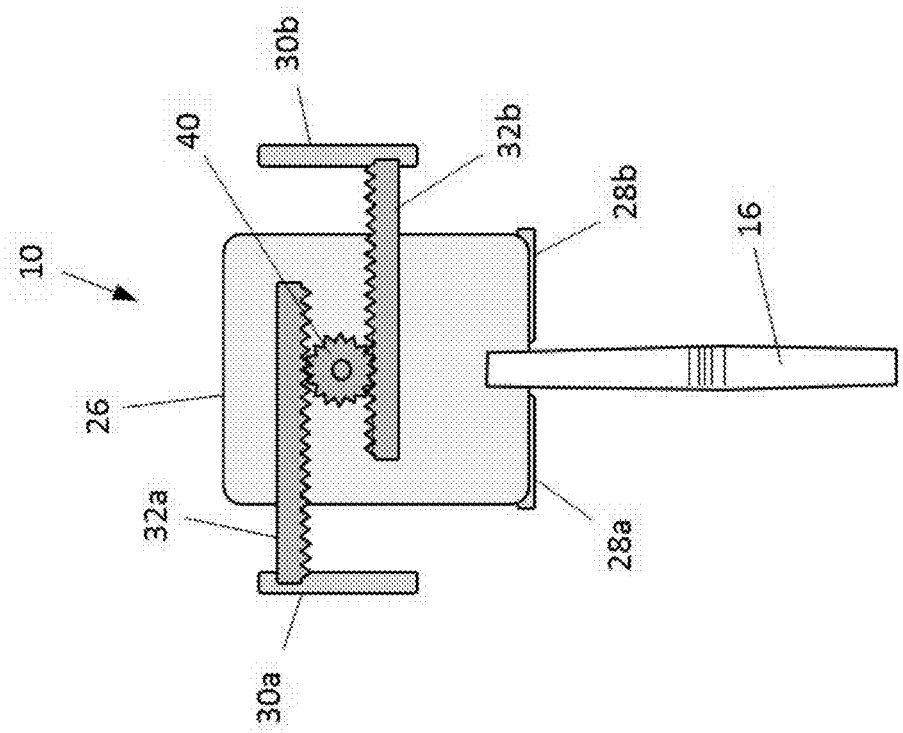
FIG. 6 shows one embodiment of an adjustment mechanism for adjusting the side panels of a mobile device cradle used with embodiments of the present invention.

The mechanism for adjustment of the side panels vis-à-vis the extension arms may exist, if at all, with one of a number of possible configurations that permit independent or simultaneous movement by the user of the side panels to open or close them away from or up against the object to be supported. For example, referring to FIGS. 4A through 4C, one embodiment of adjustment mechanism 40 is shown positioned on the back of the back plate 26. In the embodiment shown, by example only, the extension arms 32*a*, 32*b* are non-aligned (i.e., offset), with the adjustment mechanism 40 positioned therebetween. In some embodiments, the adjustment mechanism 40 may permit independent movement of each extension arm, or simultaneous adjustment of both extension arms together. Referring momentarily to FIG. 6, adjustment mechanism 40 may comprise a gear engaging the extension members where the extension members are configured with mating teeth so that movement of one extension arm outwardly or inwardly will cause the gear to drive the other extension arm concomitantly. Other embodiments of adjustment mechanisms are contemplated.

In one embodiment, such as that shown in FIGS. 2A through 4C, the extension member 16 is configured to comprise a substantially rigid material to aid in keeping the device cradle 14 substantially steady while the support system is in use, but flexible enough to adjust the position of the cradle relative to the user. The extension member embodiment comprises a first end affixed to the cup insert 12 and a second end connected to the device cradle 14. As will be appreciated below, there are various configurations of extension members contemplated for use with embodiments of the invention herein. Viewing this particular embodiment of extension member 16 from the side, as shown in FIGS. 4A through 4C, the extension member 16 is generally flat to keep a low profile within the cup insert 12 and is bendable at a middle portion to bring the cradle 14 closer or further away from the user without losing the rigidity and stability of the support function. It should be appreciated that embodiments of the present invention permit use of the system while still permitting use of the cup-holder for its original intended purposes; i.e., to hold a cup, as shown in FIG. 4C, or candidly any other small objects that users like to store in cup-holders, include detex cards, small change, etc. Indeed, it is contemplated that part of the function of the flexibility in the extension member 16 is not only to maximize the view of the object being supported in the cradle 14 to the user, but to permit the user to adjust the position of the cradle to accommodate whatever other object the user wishes to place within the cup-holder (without the cup insert 12) obstructing such storage.

Referring to FIG. 5, one example of an alternative embodiment may be described, where this alternative embodiment also happens to be shown in use with a different style of cup-holder CH2. In this example of alternative embodiment, the insert 112 is generally similar to the insert 12 of the earlier embodiments, as is the extension member 116. However, by way of example only, this embodiment of device cradle 114 comprises a back plate 126 with a ledge and side panels where the extension arms 132*a* and 132*b* are aligned, rather than non-aligned as in the early embodiments. In that regard, in such an arrangement, an adjustment mechanism may be employed, or that back plate 126 may be configured to include pockets into which the extension arms 132*a*, 132*b* may snugly slide laterally, permitting a user to simply slide one side panel independent of the other side arm, or with two hands move both together. The pocket may comprises simply an opening created by the lamination of two sheets of material joined together to form the at least part of the back plate where some lamination is avoided at the position where it is desired to accommodate the extension members 132*a*, 132*b*. The pocket may also comprises a discrete hollow member removably or permanently attached to the back of the device cradle, where the member is configured to permit slidable movement of the extension arms therewithin.

Referring to FIG. 7 as well as 8A and 8B, alternative embodiments of cup insert, cradle and extension member may be described by example only. In that regard, one example of alternative embodiment 210 comprises an alternative cup insert 112, and alternative cradle 214, and an alternative extension member 216 secured to the inside and/or outside of a cup insert 212 and the cradle 214. In this embodiment of cup insert 212, the insert comprises a partial wall 220 having an opening 222 in the wall. One may appreciate that the gap 222 permits a user to squeeze the wall to a smaller diameter to accommodate smaller cup-holders. The opening or gap 222 may be provided in the front but the size of the gab may need not be so large, as depicted, but may be much smaller depending upon the degree of flexibility of size adjustment of the insert.

As with the insert 12 described above, the material used may be metal, plastics, elastic or any other material that permits sufficient rigidity to support the extension member stably and permit the insert 12 to remain fairly stationary within the cup-holder during use. Also, as with insert 12 described above, the wall 220 may be tapered or non-tapered, and its vertical dimension and thickness may vary depending upon the material used and general flexibility of the insert desired.

Figures 8A, 8B:
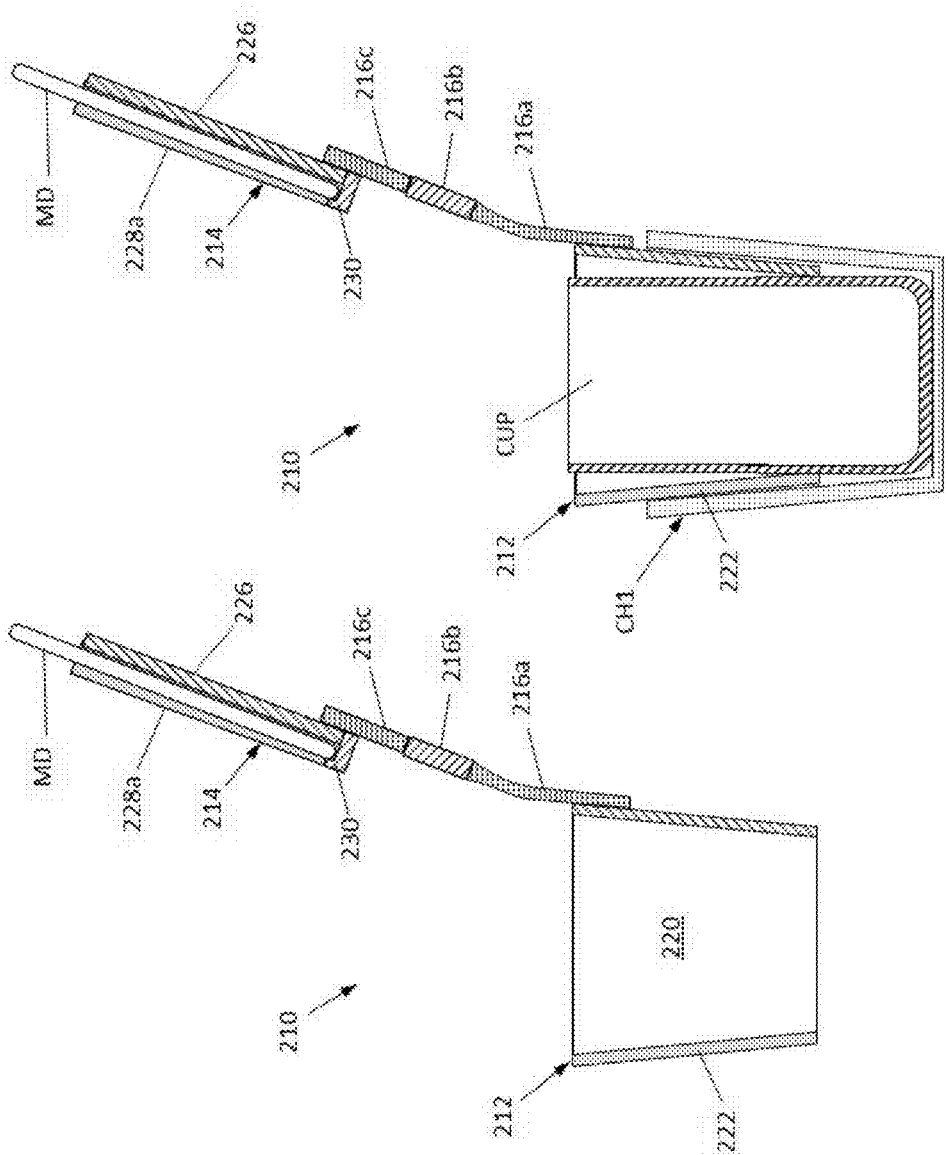
FIGS. 8A and 8B show schematic side views of the embodiment of FIG. 7 in use with one style of cup-holder to hold one style of electronic (mobile) device.

In the extension member illustrated, it may comprises a first member 216*a* secured to the cup (within the interior of insert 212 as shown in FIG. 7 or on the exterior of insert 212 as show in FIGS. 8A and 8B). The extension member also comprises a second member 216*b* that is configured to permit telescoping movement of a third member 216*c* to raise or lower the cradle 214 as desired. One of numerous means of locking the third member in place relative to the second member once adjusted to the right or desired height, and is not the subject of the invention herein. Nor is the specifics of the telescoping action and configuration of the second and third members the subject of the invention herein. However, the first member is preferably, although not necessarily, flexible enough to permit not only height adjustment using the telescoping feature of this embodiment of extension member, but also permits the user to move the cradle closer or further away from the user, as may be appreciated from the side views of FIGS. 8A and 8B. Once again it can be appreciated that the cup-holder may still be used to store other items within, such as a cup or other objects, as described above.

In the embodiments shown in FIGS. 7, 8A and 8B, cradle 214 may comprise a slightly simpler design of a back plate 226, a single ledge 230 and two non-adjustable side panels 228*a*, 228*b*. The cradle is preferably large enough to accommodate a number of objects, but may be made specific to certain objects. For example, one simpler fixed size cradle may be made to accommodate smart phones, while another may be made to accommodate tablets. Of course the one big enough to support tablets could also be used to support smaller objects as well.

It must be noted that such alternative configurations for the insert, cradle and extension member may be used together or interchanged with others, so that the examples of combinations of embodiments illustrated and described are not intended to limit other embodiments that may employ one configuration of cup insert with a different embodiment of cradle and yet another embodiment of extension member. For example, insert 212 may be used with embodiment 10, or cradle 14 may be used with embodiment 210, etc. Thus, for convenience and efficiency only, certain examples of embodiments of each main component are shown and described together, but not for purposes of limiting which ones are used with which others.

Figure 9:
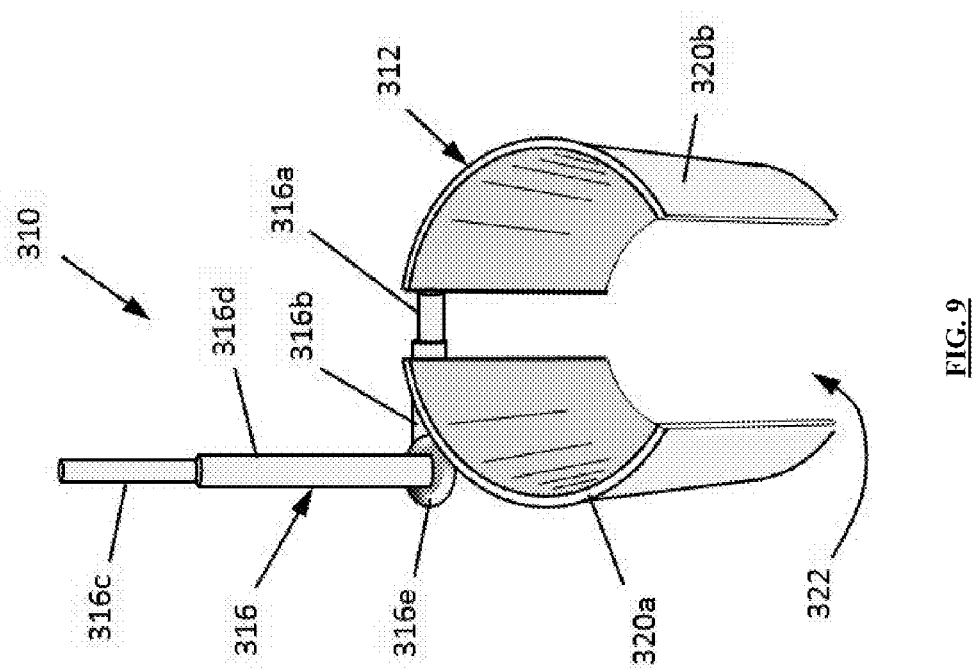
FIG. 9 shows a perspective view of yet another alternative embodiment of the present invention.

Referring to FIG. 9, yet another embodiment of the present invention may be appreciated. In that regard, embodiment 310 comprises an alternative cup insert 312 and alternative extension member 316. Cup insert 312 comprises a plurality of wall members, in this example two wall members 320a, 32b discretely configured to move closer or further apart. A gap 322 may be provided in the front, as in earlier embodiments, but the side of the gab may need not be so large, as depicted, but may be much smaller depending upon the degree of flexibility of size adjustment of the insert.

In that regard, extension member 316 illustrated in FIG. 9 functions to not only control the distance and position of the cradle relative to the user, but also functions to actuate the position of one of the plurality of wall members relative to the other. Thus, in one embodiment, extension member 316 may comprise a first telescoping set of members 316a and 316b in which the first member 316a is attached to one of the wall component 320b while the second member 316b is attached to the other wall component 320a so that movement of the telescoping members 316a and 316b may control the relative position of the wall components, applying pressure to the interior of the cup-holder for the purpose of anchoring the insert, thus providing an even more stable and secure platform base. Such an arrangement also permits flexibility in accommodating multiple shapes and sizes of cup-holders.

Preferably, the extension member 316 comprises a second telescoping set of members 316c and 316d to permit height of adjustment of the cradle (not shown, but in which any embodiment of cradle may be used), as described above. The first and second telescoping sets may be joined together at a junction point that may comprise an adjustable connector 316e of one or various configurations. It may comprise a universal joint, or may simply comprise a connector having plastic flexibility, sufficiently rigid to hold its position that a user places its into, but flexible enough to be moved into a different position. Indeed, numerous possible configurations are contemplated to function to control the relative movement of the wall components 320a, 320b as well as the position and the height of the cradle. But the particulars are not limited by the examples described herein. Indeed, locks may be provided to lock the various extension member components into place where the user positions them relative to one another. Numerous embodiments of locks may be employed, including locks similar or the same as those used on vice grips or other similar tools. Electronic controls may be employed as well to remotely control the relative position of the cradle relative to the cup insert and cup-holder.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A support system for adjustably supporting an electronic device, such as a smart phone, a tablet, etc., so that the display of the device is held substantially steady for use by a device user, the support system configured for engagement with a cup-holder, such as those found on automotive vehicles, the support system comprising:

a thin-walled, hollow, insert comprising a rigid yet flexible material, the insert having a shape configured to snugly fit within the interior of a cup-holder while still permitting the insertion of a cup into the cup-holder so that the device user may still store a drink while the cup-holder simultaneously provides a base for the electronic device support system;

a device cradle comprising a back plate against which the electronic device may rest, a ledge upon which the electronic device may rest, and adjustable first and second side panels configured to snugly engage the side of the electronic device when it is resting upon the ledge and against the back plate, the adjustable first and second side panels being movable from a first open position, wider than the width of the electronic device, and a second closed position, substantially equal to the width of the electronic device so that the device cradle may snugly cradle the electronic device in a substantially steady position even when the user is driving an automotive vehicle within which the cup-holder resides; and an extension member affixed to the insert at a first end of the extension member and affixed to the device cradle at a second end of the extension member, the extension member comprising a substantially rigid material to aid in keeping the device cradle substantially steady while the support system is in use, wherein the support system, when placed within a cup-holder for use, permits a user to view and operate the electronic device while it is suspended above the cup-holder in a substantially steady position sufficient for the user to effectively view and operate the electronic device.

2. The support system of claim 1, wherein the extension member comprises a bendable portion to permit a user to bend the extension member between at least a first position and a second position so that the user may position the electronic device at the most desirable viewable angle relative to the user's position vis-à-vis the cup-holder.

3. The support system of claim 1, wherein the extension member comprises a telescoping configuration.

4. The support system of claim 1, wherein the insert has a tapered profile to snugly fit within a tapered cup-holder.

5. The support system of claim 1, wherein the insert comprises a plurality of discrete members linked to each other in a manner that permits movement of one member relative to another member to more loosely or more snugly fit within the cup-holder to allow the user to alternatively securely anchor the device in the cup-holder when tightened and easily remove the device when desired to be released.

6. The support system of claim 5, further comprising a locking mechanism for locking the discrete members in place against the interior wall of the cup-holder to apply a more snug fit with the cup-holder sufficient to support a heavy electronic device.

* * * * *